United States Patent
Vytla

(10) Patent No.: US 11,070,483 B2
(45) Date of Patent: Jul. 20, 2021

(54) DISCOVERING AND MITIGATING MTU/FRAGMENTATION ISSUES IN A COMPUTER NETWORK

(71) Applicant: Cisco Technology, Inc., San Jose, CA (US)

(72) Inventor: Mouli Vytla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 32 days.

(21) Appl. No.: 16/272,441

(22) Filed: Feb. 11, 2019

(65) Prior Publication Data
US 2020/0259758 A1    Aug. 13, 2020

(51) Int. Cl.
| | |
|---|---|
| *H04L 12/24* | (2006.01) |
| *H04L 12/805* | (2013.01) |
| *H04L 12/947* | (2013.01) |
| *G06N 20/00* | (2019.01) |
| *H04L 12/823* | (2013.01) |
| *H04L 29/08* | (2006.01) |

(52) U.S. Cl.
CPC ............. *H04L 47/36* (2013.01); *G06N 20/00* (2019.01); *H04L 41/0813* (2013.01); *H04L 47/32* (2013.01); *H04L 49/25* (2013.01); *H04L 69/325* (2013.01)

(58) Field of Classification Search
None
See application file for complete search history.

(56) References Cited

U.S. PATENT DOCUMENTS

| | | | |
|---|---|---|---|
| 2005/0041635 A1* | 2/2005 | Chung | H04L 47/36 370/351 |
| 2007/0171828 A1 | 7/2007 | Dalal et al. | |
| 2014/0250237 A1* | 9/2014 | Shama | H04L 47/36 709/232 |
| 2015/0023146 A1* | 1/2015 | Suzuki | H04L 45/28 370/216 |
| 2015/0341278 A1* | 11/2015 | Sundar | H04L 47/36 370/392 |
| 2016/0164794 A1* | 6/2016 | Ramalingam | H04L 47/365 370/235 |
| 2017/0149639 A1 | 5/2017 | Vasseur et al. | |
| 2019/0014054 A1* | 1/2019 | Cagle | H04W 28/06 |

FOREIGN PATENT DOCUMENTS

| | | |
|---|---|---|
| CN | 101552728 | 5/2012 |
| CN | 101695048 | 5/2012 |

\* cited by examiner

*Primary Examiner* — Noel R Beharry
*Assistant Examiner* — Pamit Kaur
(74) *Attorney, Agent, or Firm* — Behmke Innovation Group LLC; Kenneth J. Heywood; Jonathon P. Western

(57) ABSTRACT

In one embodiment, a maximum transmission unit (MTU) mismatch assessment service receives a notification of a mismatch between a packet size of a packet sent by a source to a destination in a network and an MTU of an intermediate router between the source and destination in the network. The service determines, using a machine learning-based model, that the mismatch represents a persistent MTU mismatch condition at the intermediate router. The service identifies a target router in the network to receive a configuration adjustment instruction, based on the persistent MTU mismatch condition. The service sends the configuration adjustment instruction to the target router, to alleviate the persistent MTU mismatch condition at the intermediate router.

18 Claims, 10 Drawing Sheets

DISCOVERING AND MITIGATING MTU/FRAGMENTATION ISSUES IN A COMPUTER NETWORK

TECHNICAL FIELD

The present disclosure relates generally to computer networks, and, more particularly, to discovering and mitigating maximum transmission unit (MTU)/fragmentation issues in a computer network.

BACKGROUND

In computer networks, the maximum transmission unit (MTU) is the maximum size of a single frame, packet, or other data unit that can be transmitted via the network. Typically, the MTU is a configurable setting on a networking device. When there is an MTU mismatch between portions of the network, this can lead to the situation in which an incoming frame, packet, or other data unit is larger than allowed on the outgoing interface. In such a case, two possibilities exist: 1.) the data unit can be fragmented into multiple, smaller data units for transmission or 2.) the data unit can be dropped. However, both of these approaches can impinge on the performance of the network.

In the case of fragmenting a data unit due to an MTU mismatch, fragmentation is typically performed in software. This adds to both the latency of the communication, as well as consuming additional resources on the networking device performing the fragmentation, which can lead to sluggish network performance. In addition, as the same processor performing the fragmentation also processes control packets for purposes of control plane policing, fragmenting data units could potentially lead to network instabilities.

In the case of dropping a data unit due to an MTU mismatch, this is typically done in conjunction with requesting that the source of the communication begin fragmenting its data units into smaller data units. For example, an Internet Control Messaging Protocol (ICMP) messages can be sent back to the source, to request self-fragmentation of its communications. However, many firewalls and other security devices now typically block incoming ICMP messages, thereby preventing the fragmentation request from reaching the source.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
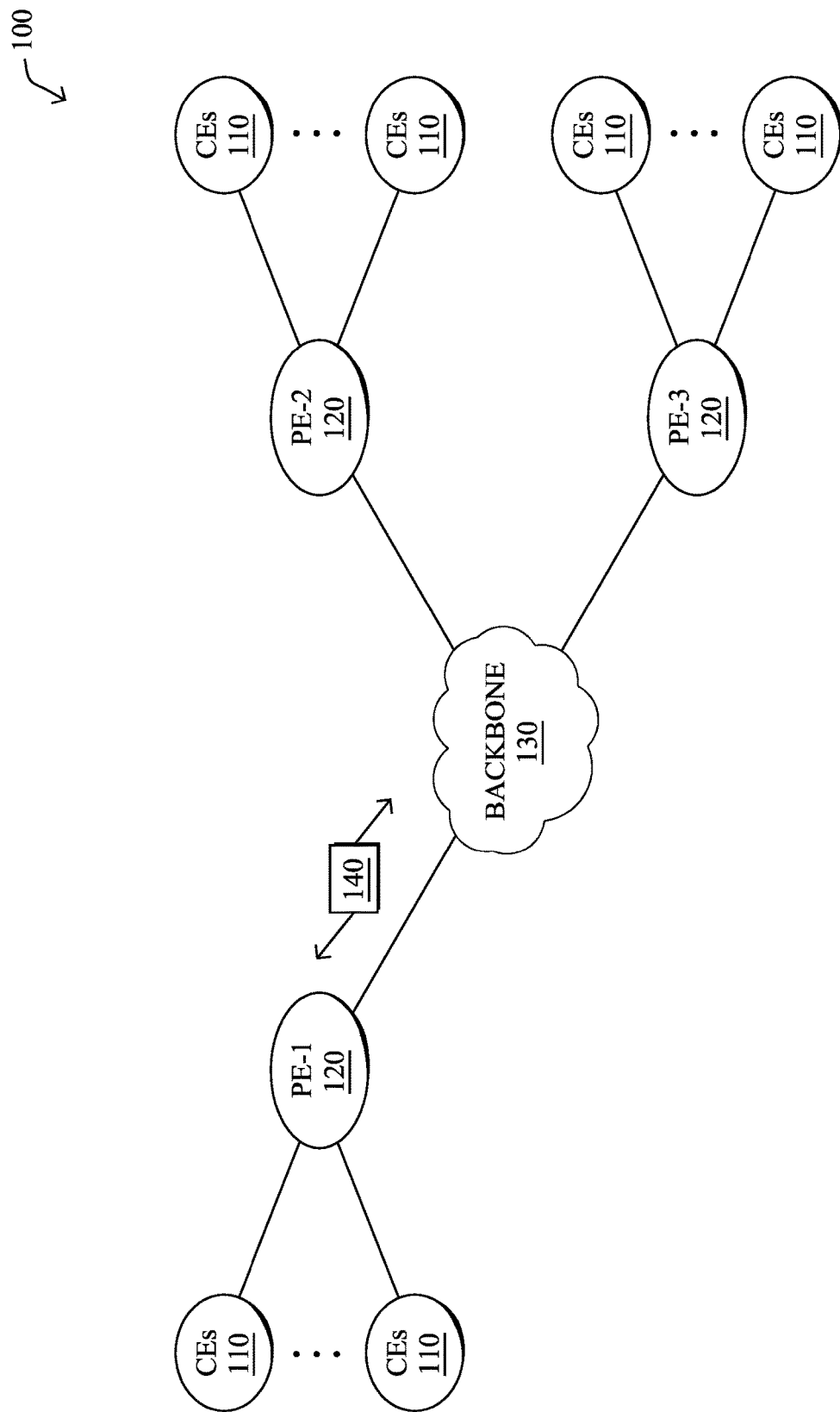
FIGS. 1A-1B illustrate an example computer network.

According to one or more embodiments of the disclosure, a maximum transmission unit (MTU) mismatch assessment service receives a notification of a mismatch between a packet size of a packet sent by a source to a destination in a network and an MTU of an intermediate router between the source and destination in the network. The service determines, using a machine learning-based model, that the mismatch represents a persistent MTU mismatch condition at the intermediate router. The service identifies a target router in the network to receive a configuration adjustment instruction, based on the persistent MTU mismatch condition. The service sends the configuration adjustment instruction to the target router, to alleviate the persistent MTU mismatch condition at the intermediate router.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
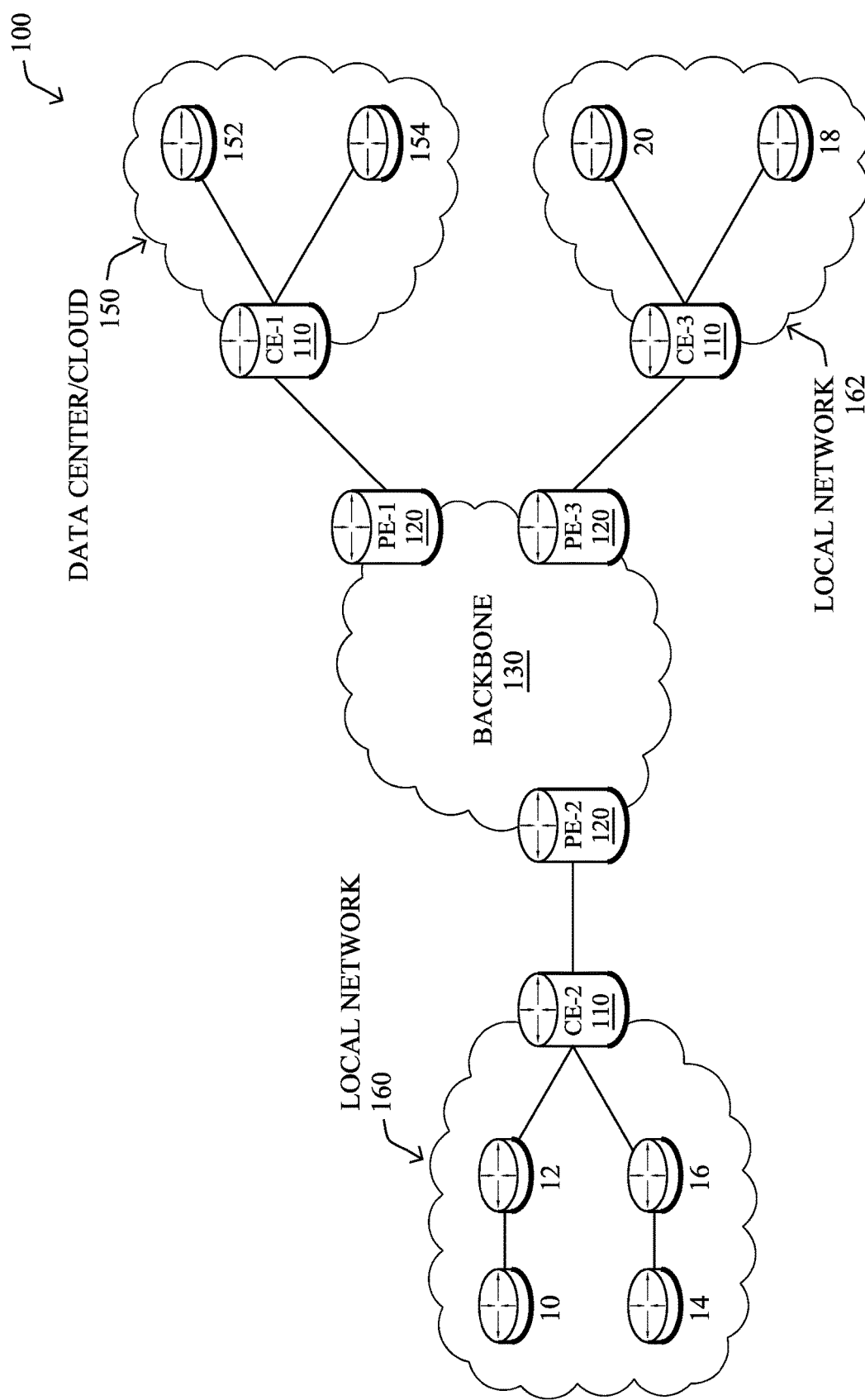

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
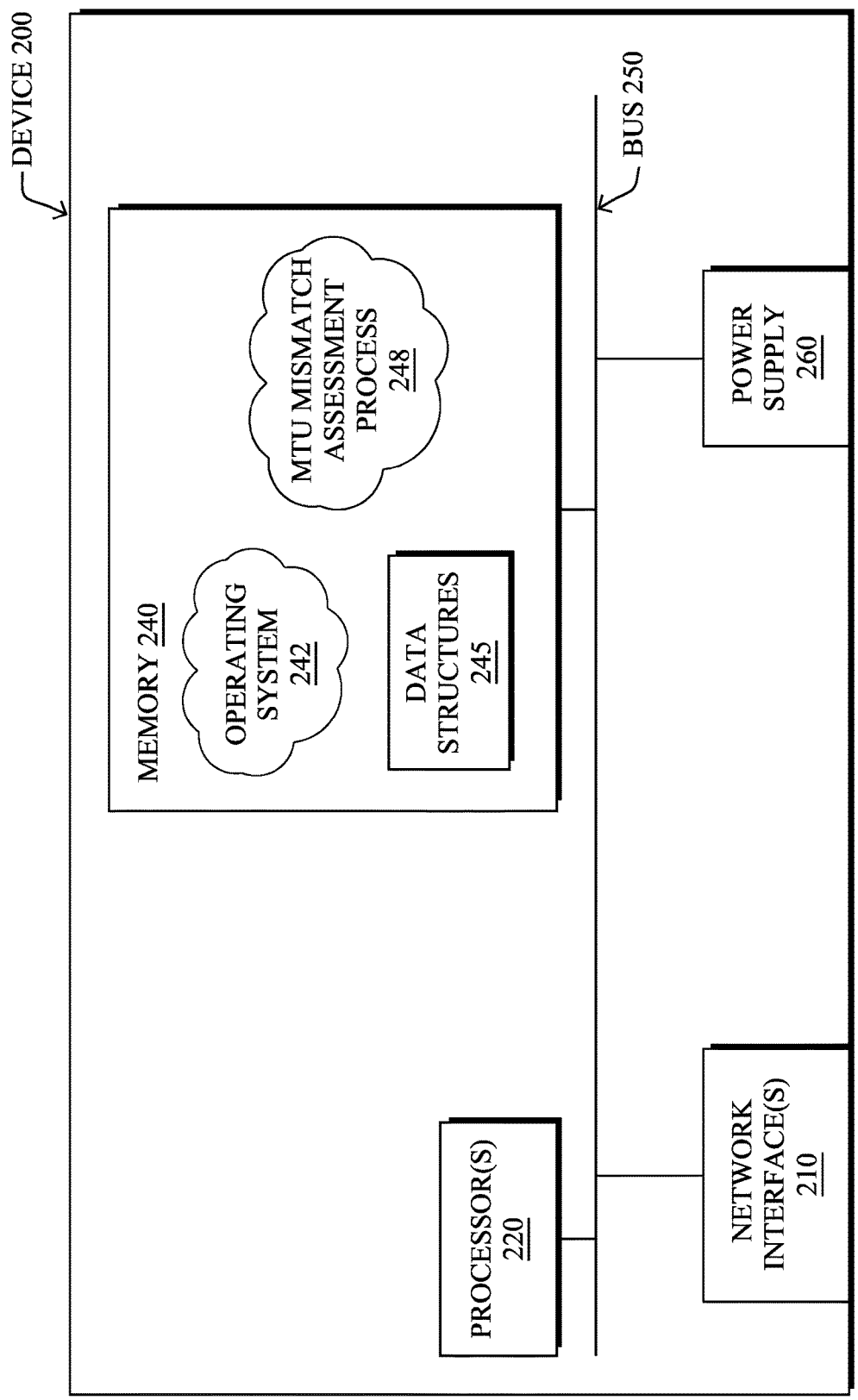
FIG. 2 illustrates an example network device/node.

FIG. 2 is a schematic block diagram of an example node/device 200 (e.g., a physical apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250 and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a maximum transmission unit (MTU) mismatch assessment process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

During execution, MTU mismatch assessment process 248 may use one or more machine learning-based models to identify and alleviate persistent MTU mismatch conditions in a network. To do so, MTU mismatch assessment process 248 may employ any number of machine learning techniques. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, MTU mismatch assessment process 248 can use the model M to classify new data points, such as information regarding new traffic flows in the network. Often, M is a statistical model, and the cost function is inversely proportional to the likelihood of M, given the input data.

In various embodiments, MTU mismatch assessment process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "MTU mismatch condition," or "normal condition." On the other end of the spectrum are unsupervised techniques that do not require a training set of labels. Notably, while a supervised learning model may look for previously seen patterns that have been labeled as such, an unsupervised model may instead look to whether there are changes in the behavior of the network traffic over time. Semi-supervised learning models take a middle ground approach that uses a greatly reduced set of labeled training data.

Example machine learning techniques that MTU mismatch assessment process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly determined that there is a persistent MTU mismatch condition in the network. Conversely, the false negatives of the model may refer to the number of times the model incorrectly predicted normal operation of the network, when a persistent MTU mismatch condition is actually present. True negatives and positives may refer to the number of times the model correctly predicted either normal behavior or a persistent MTU condition, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, the MTU represents the largest size frame, packet, or other data unit can be transmitted by a network. Typically, the MTU can be configured on a per-interface basis (e.g., serial port, network interface controller, etc.). This means that, for any given path between a source and destination of a network communication, there exists the potential for there to be an MTU mismatch along the path.

Despite mechanisms to discover the path MTU along a network path, there continues to be MTU-related issues that can be attributed to incorrect or sub-optimal MTU settings. Factors contributing to these issues multi-fold:

1. ICMP is used to signal a "fragmentation needed" message back to the source—In many deployments, intermediate nodes/firewalls block ICMP messages. Indeed, network and security administrators are two different teams often leading to lack of coordination.
2. The network continues to work, but sluggish performance goes unnoticed—Somewhere along the network path, where the MTU is lower, the router that sees the mismatched MTU (ingress→egress) may fragment the packets. However, such fragmentation is performed in software, adding to packet latency and increased CPU load.

3. Network Instability—As the large packets (packets needing fragmentation) and Control packets (L2 protocols, L3 protocols) go to the same RouteProcessor CPU, control plane policing (CoPP) can potentially drop packets and it can lead to protocol convergence issues and packet retries.
4. TCP negotiates end-to-end MTS and that causes intermittent problems—If the MTU is less in one of the intermediate nodes and TCP has negotiated large Maximum TCP Segment Size (MSS) end-to-end, problems arise, intermittently. As would be appreciate, MSS negotiation happens during TCP handshake. As long as the data traffic is less than smallest MTU in the path, the application works fine. However, as soon as the application starts transmitting large packet (e.g., smallest MTU<packet size<MSS and the 'do not fragment' bit is set), the application fails. Further, while an older version of application may have worked with no issues, when the application is upgraded to newer version, things may break due to the new version transmitting larger payloads.
5. Tunneled traffic—With more and more traffic being tunneled using technologies such as IPSec, VxLAN, GRE, NVGRE, and the like, it is difficult to identify a suitable MTU and the chance for fragmentation increases considerably.
6. Application movement—With dynamic workload migration and micro-services/container-based application deployments, many remote applications no longer run in a static location, such as on a single server, from network traffic path point of view. This makes MTU issues even more prominent.
7. Bandwidth miscalculation and latency—Applications such as professional media networks (PMN) reserve physical link bandwidth for media flows. The media streaming then occurs, while also considering the reserved bandwidth. When fragmentation occurs, the flow exceeds the reserved bandwidth, since fragmentation introduces additional header overhead for each fragmented packet and a large packet can be fragmented to N smaller packets. Software-based forwarding of the fragmented packets also increases latency, as noted above, which can be particularly detrimental to streaming media.

Today, while path MTU discovery and configurable MTU settings can help to alleviate some of the MTU/fragmentation issues in a computer network, the complexity and various scenarios above still lead to ongoing issues, in many networks. Further, as networks continue to increase in size and complexity, MTU mismatch problems are also likely to increase in frequency.

Discovering and Mitigating MTU/Fragmentation Issues in a Computer Network

The techniques herein introduce a machine learning-based approach to alleviating issues in a network due to persistent MTU mismatch conditions. In some aspects, an MTU mismatch assessment service may operate in conjunction with any number of networking devices (e.g., routers, switches, etc.) to identify such issues and, when detected, issue configuration adjustments to the appropriate device(s).

Specifically, according to one or more embodiments of the disclosure as described in detail below, a maximum transmission unit (MTU) mismatch assessment service receives a notification of a mismatch between a packet size of a packet sent by a source to a destination in a network and an MTU of an intermediate router between the source and destination in the network. The service determines, using a machine learning-based model, that the mismatch represents a persistent MTU mismatch condition at the intermediate router. The service identifies a target router in the network to receive a configuration adjustment instruction, based on the persistent MTU mismatch condition. The service sends the configuration adjustment instruction to the target router, to alleviate the persistent MTU mismatch condition at the intermediate router.

Illustratively, the techniques described herein may be performed by hardware, software, and/or firmware, such as in accordance with the MTU mismatch assessment process 248, which may include computer executable instructions executed by the processor 220 (or independent processor of interfaces 210) to perform functions relating to the techniques described herein.

Operationally, the techniques herein introduce a mechanism to detect that fragmentation and/or packet drops are occurring in the network due to an MTU mismatch condition and identify a target node in the network to signal, in an effort to alleviate the mismatch condition. Such a mechanism may be fully automatic or, alternatively, provide information regarding the MTU mismatch condition to a user interface for review by a network administrator, prior to taking any corrective actions. In addition, the techniques herein introduce a closed-loop approach to making adjustments to the network, meaning that the service may continue to monitor the network to ensure that the adjustment alleviates the issues. If not, the service may initiate measures such as model retraining, allowing the service to become 'smarter' over time.

Figure 3A:
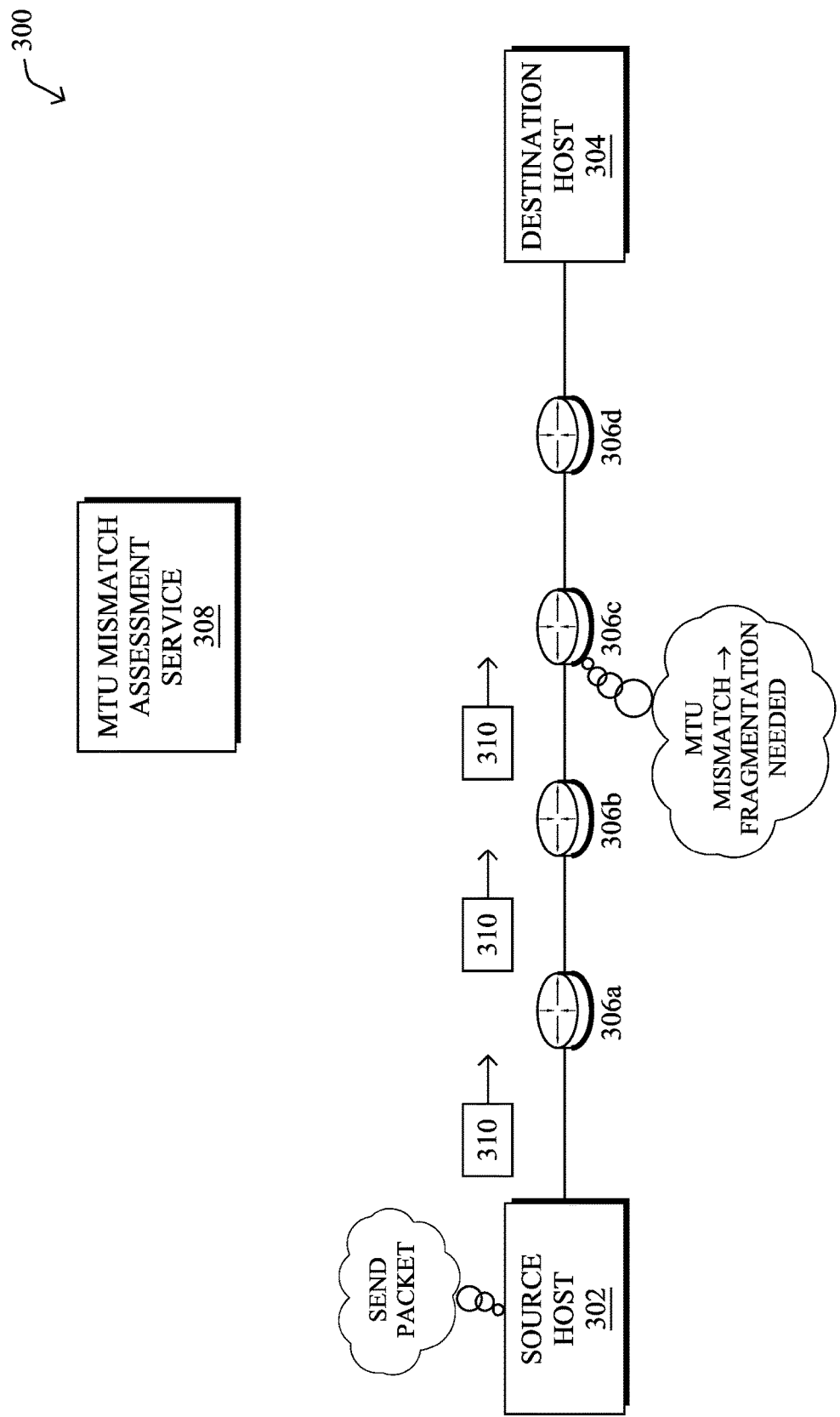
FIGS. 3A-3C illustrate an example of alleviating fragmentation in a network due to a persistent maximum transmission unit (MTU) mismatch condition.
Figure 3B:
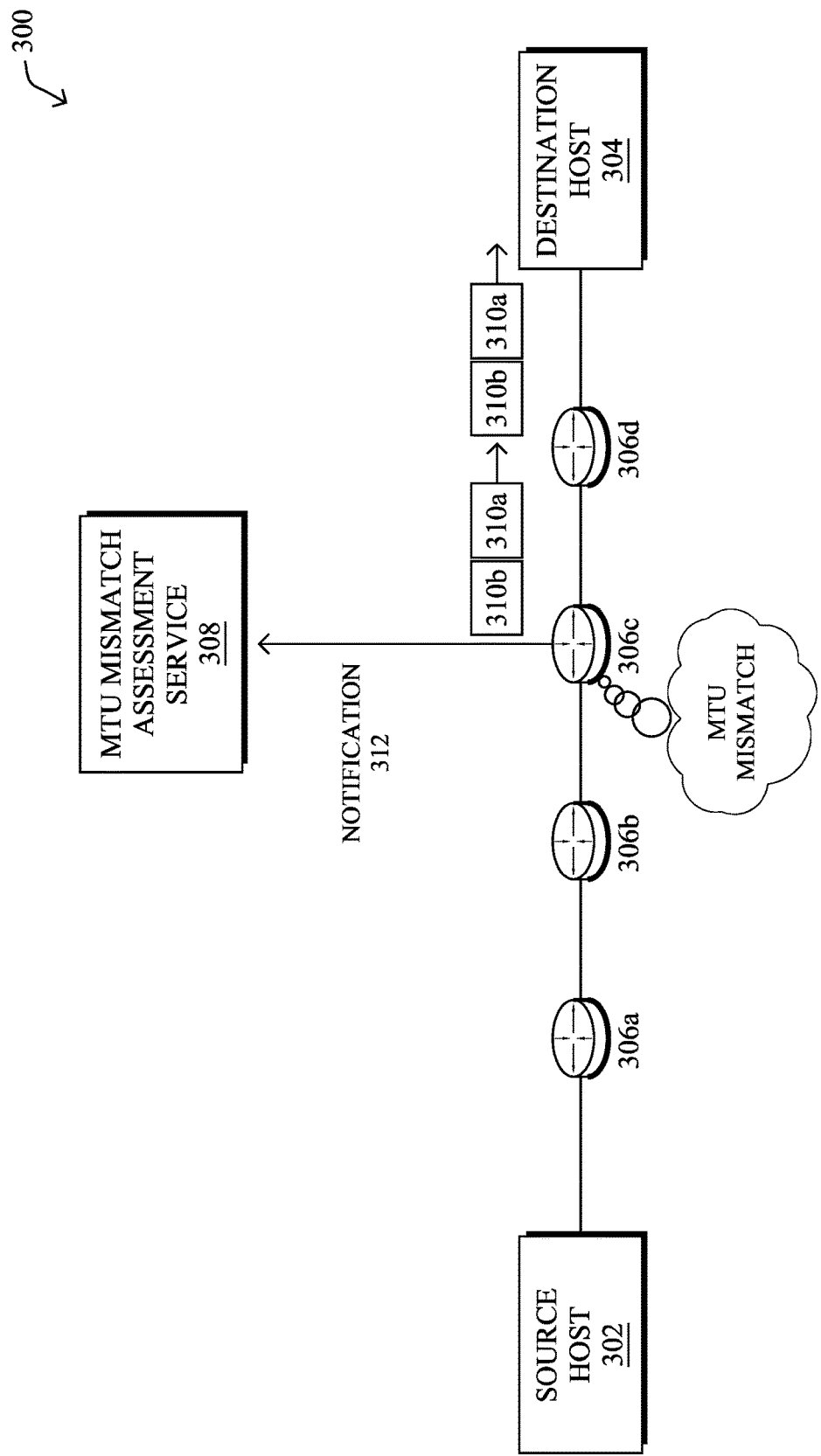
Figure 3C:
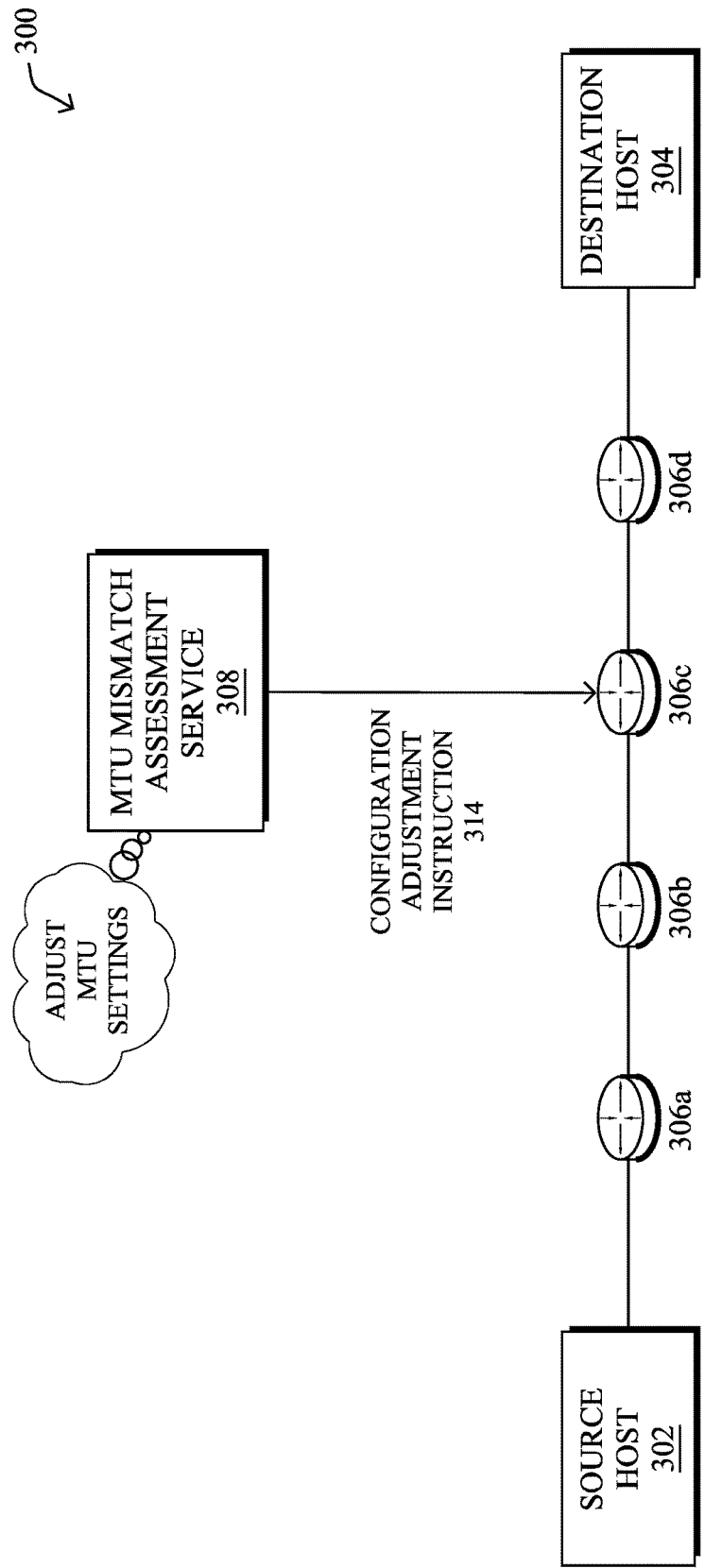

FIGS. 3A-3C illustrate an example of alleviating fragmentation in a network due to a persistent maximum transmission unit (MTU) mismatch condition. As shown in FIG. 3A, assume that network 300 includes a source host 302 that is to communicate with a destination 304. Along the network path between source host 302 and destination host 304 in network 300 may be any number of networking devices, such as routers 306a-306d. As would be appreciated, there may be any number of networking devices (e.g., routers, switches, etc.) along a network path and the simplified path shown is for illustrative purposes, only.

In various embodiments, any or all of the networking devices along the network path between source host 302 and destination host 304 may be in communication with a supervisory service that oversees their operations, such as MTU mismatch assessment service 308. Indeed, the Digital Network Architecture (DNA) by Cisco Systems, Inc., and similar supervisory mechanisms now provide for cloud-based network assurance by centralizing the oversight and administration over the networking devices in a network. Accordingly, MTU mismatch assessment service 308 may be provided by one or more devices (e.g., a device 200), either as a standalone service or as part of a larger network assurance service, such as Cisco's DNA.

During use, source host 302 may send a packet 310 along the network path towards destination host 304 with a packet size of 1600 bytes with its 'do not fragment' (DNF) bit left unset. In turn, the first hop router of source host 302, router 306a may forward packet 310 to router 306b. Similarly, router 306b may forward the packet on to router 306c. If, for example, the interfaces of routers 306a-306b have configured MTUs that are larger than the size of packet 310 (e.g., each interface has an MTU of 9216), these operations may proceed without issue.

Now, assume that the uplink interface of router 306c has a configured MTU of 9216, but its downlink interface with router 306d has a configured MTU of only 1500 bytes. In such a case, the MTU mismatch condition means that router 306c cannot send packet 310 on to router 306d as-is.

Since packet 310 did not have its DF bit set, router 306c may fragment packet 310 into smaller packets, such as packets 310a and 310b, as shown in FIG. 3B. In turn, router 306d may forward the fragmented packets 310a-310b on to destination host 304. Destination host 304 may then reassemble packet 310 from the received fragmented packets 310a-310b.

According to various embodiments, when router 306c encounters an MTU mismatch condition with respect to packet 310, it may send a notification 312 to MTU mismatch assessment service 308 regarding the MTU mismatch condition. In general, notification 312 may include any or all information needed by MTU mismatch assessment service 308 to determine whether the MTU mismatch condition is persistent and, if so, how to alleviate the condition. For example, notification 312 may indicate any or all of the following:

- The identity of router 306c, where fragmentation is occurring.
- The MTU configuration of the upstream link/ingress interface of router 306c on which packet 310 was received.
- The MTU configuration of the downstream link/egress interface of router 306c via which fragmented packets 310a-310b were sent.
- Interface information for router 306c via which packet 310 ingressed and packets 310a-310b egressed.
- The address (e.g., IP address) of source host 302.
- The address (e.g., IP address) of destination host 304.
- Port information for source host 302 (e.g., L4 port used to send packet 310).
- Port information for destination host 304
- Whether router 306c dropped packet 310 or fragmented packet 310. For example, this may be represented by an indication as to whether the DF bit of packet 310 was set.
- The type of egress encapsulation used by router 306c, if any. For example, notification 310 may indicate whether router 306c sent fragmented packets 310a-310b onward to router 306d via regular L3 forwarding or via tunneling (e.g., using IPSec, VxLAN, GRE, NVGRE, or the like).
- The identity of the first hop router of source host 302, router 306a.

In response to receiving notification 310, MTU mismatch assessment service 308 may determine whether the MTU mismatch condition on router 306c is a persistent condition and, if so, the appropriate corrective measures to alleviate this condition. Indeed, it may very well be that the MTU mismatch is only transitory and changing the configuration of router 306c too often may also be detrimental to its operations.

In various embodiments, MTU mismatch assessment service 308 may employ a machine learning-based model to determine whether the MTU mismatch condition at router 306c is persistent. For example, MTU mismatch assessment service 308 may construct a time series or regression-based model that is able to predict a frequency of occurrence and/or time of occurrence of the MTU mismatch. For example, MTU mismatch assessment service 308 may determine that the traffic between source host 302 and destination host 304 is seasonal and that the MTU mismatch is likely to reoccur at a certain time. In other words, the persistence of an MTU mismatch condition can be viewed as representing the likelihood of the condition reoccurring or affecting a certain threshold amount of traffic. Such a model may be trained, for example, using a history of notifications, such as notification 312, regarding MTU mismatch conditions at router 306c.

If MTU mismatch assessment service 308 determines that the MTU mismatch condition is persistent at router 306c, it may take any number of measures, to alleviate this condition. In some embodiments, MTU mismatch assessment service 308 may provide an indication of the condition to a user interface, as well as information regarding the condition (e.g., the information included in notification 312, etc.). In turn, a network administrator may enter a corrective action, such as an adjustment to the MTU configuration of router 306c. Alternatively, if allowed, MTU mismatch assessment service 308 may automatically determine the corrective action and initiate the action.

As shown in FIG. 3C, assume that MTU mismatch assessment service 308 determines that the MTU mismatch that affected packet 310 is a persistent condition. In such a case, MTU mismatch assessment service 308 may determine that the MTU configuration of the downlink interface of router 306c that links router 306c to router 306d should be raised from an MTU of 1500 bytes to 9216 bytes, to match its upstream interface. In turn, MTU mismatch assessment service 308 may send a configuration adjustment instruction 314 to router 306c that implements the MTU configuration change on router 306c. By doing so, further packets sent from source host 302 to destination host 304 via router 306c should no longer require fragmentation.

Figure 4A:
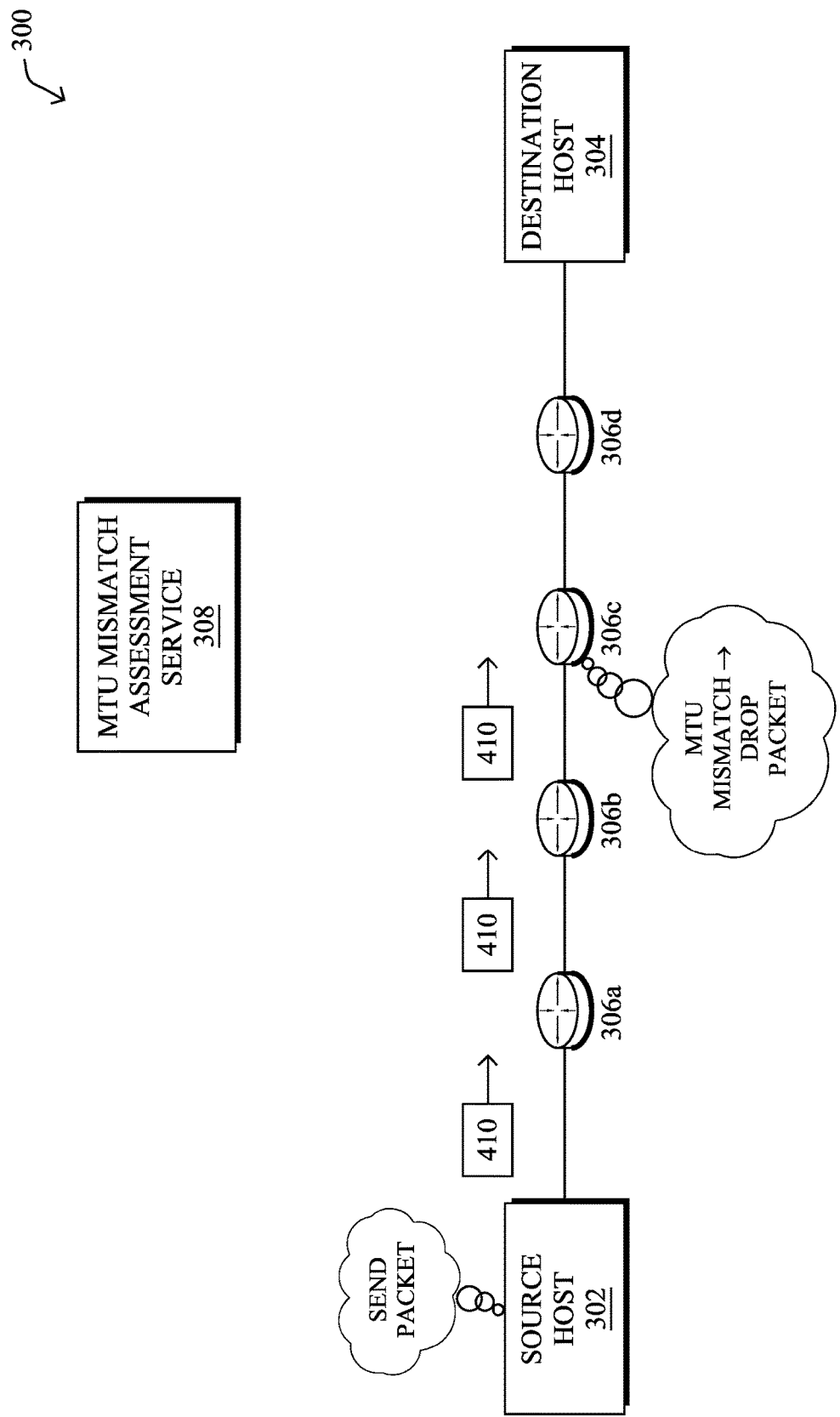
FIGS. 4A-4C illustrate an example of alleviating drops in a network due to a persistent MTU mismatch condition.
Figure 4B:
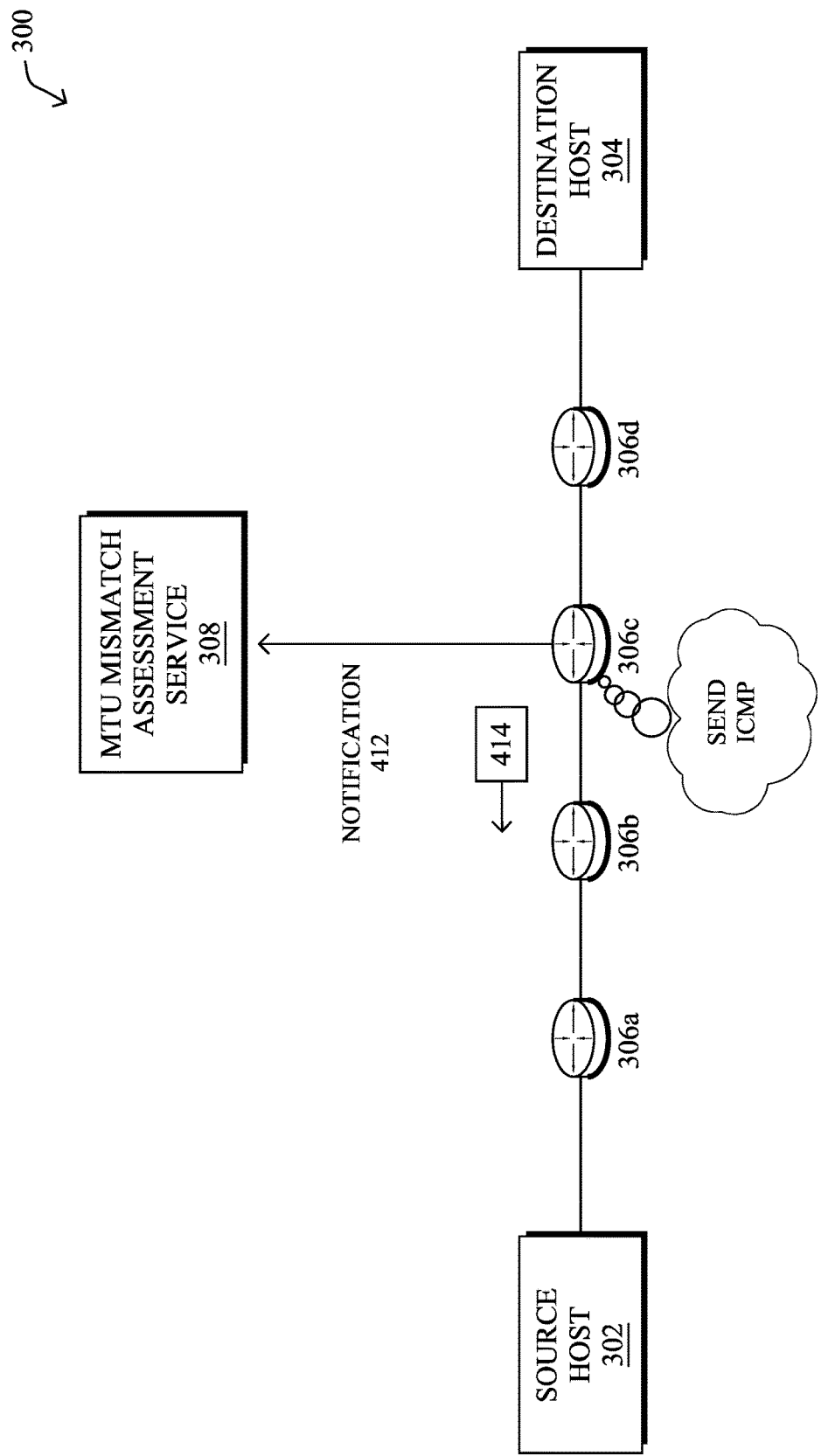
Figure 4C:
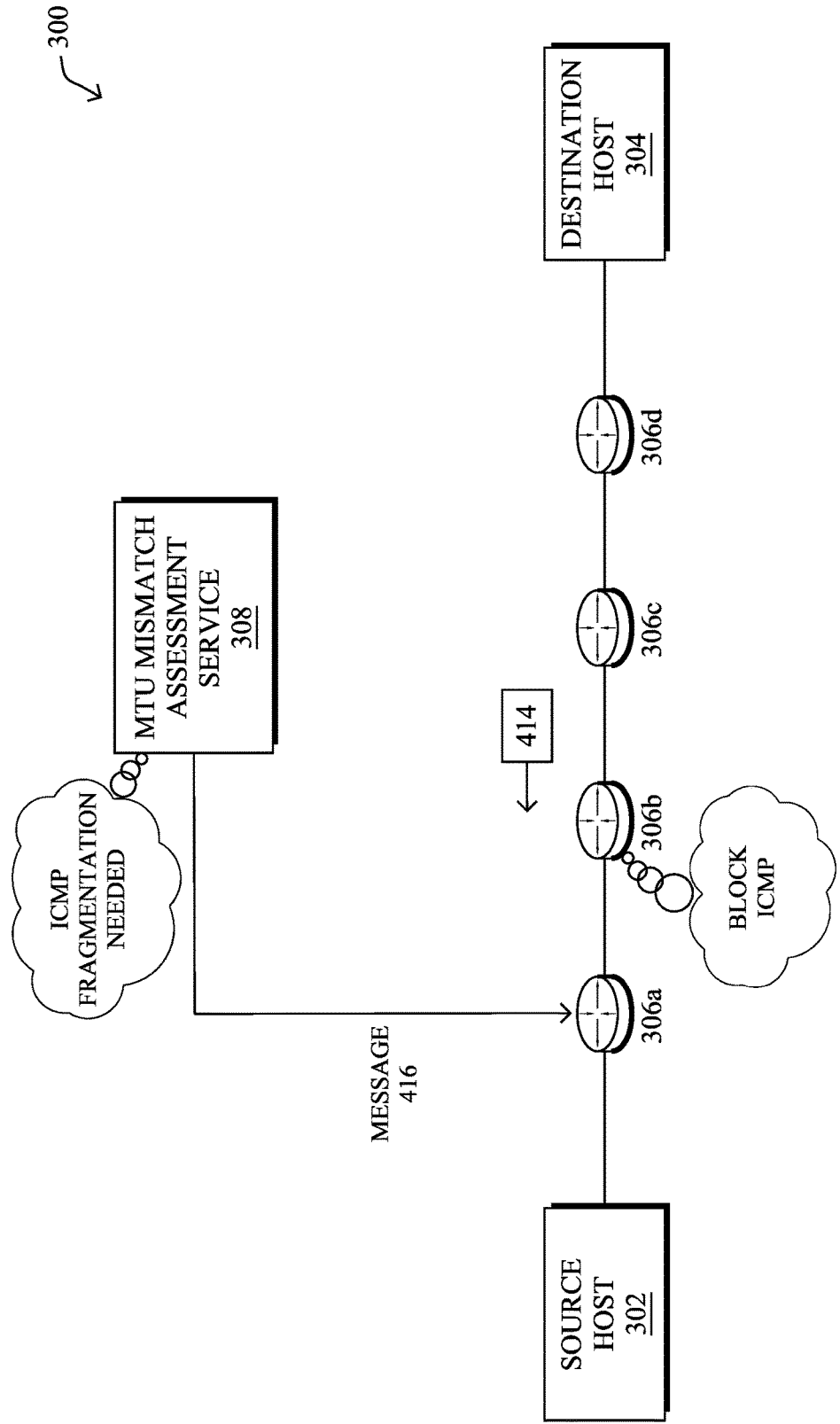

FIGS. 4A-4C illustrate an example of alleviating drops in a network due to a persistent MTU mismatch condition, in further embodiments. As noted, another potential mechanism to address MTU mismatch issues is to drop the packet. For example, as shown in FIG. 4A, consider again network 300 described with respect to FIGS. 3A-3C whereby the ingress and egress interfaces of router 306c do not match (e.g., an uplink MTU of 9216 bytes and a downlink MTU of 1500 bytes). In the example shown, further assume that source host 302 sends a packet 410 towards destination host 304 that again is of 1600 bytes, thus resulting in an MTU mismatch condition at router 306c.

In another mode of operation, assume that packet 410 has its DF bit set, indicating to router 306c that packet 410 should be dropped instead of fragmented. Thus, when router 306c processes packet 410 and determines that an MTU mismatch condition exists, it may drop packet 410.

As shown in FIG. 4B, when a packet is dropped due to an MTU mismatch condition, the networking device may signal back to the source of the packet that it should begin sending smaller packets. For example, as shown, in conjunction with dropping packet 410, router 306c may also send an ICMP notification 414 back towards source host 302 to request that source host 302 begin fragmenting its packets for destination host 304 or unset the DF bit in future packets.

In various embodiments, similar to the case of router 306c fragmenting packet 310, router 306c may also send a notification 412 to MTU mismatch assessment service 308 regarding the MTU mismatch condition that caused router 306c to drop packet 410. Notification 412 may include any or all of the information detailed above with respect to notification 312. Based on notification 412, MTU mismatch assessment service 308 may use its machine learning model to determine whether the MTU mismatch condition at router 306c is persistent.

As shown in FIG. 4C, assume now that ICMP notification 414 is blocked, prior to delivery to source host 302. This is a relatively common occurrence with modern day network security mechanisms, such as firewalls. In such a case, the ICMP signaling back to source host 302 will fail and source host 302 may continue to send packets that are too large towards destination host 304 with the DF bit set.

In various embodiments, MTU mismatch assessment service 308 may determine that the action needed to alleviate the MTU mismatch condition that caused router 306c to drop packet 410 is to send a separate notification message 416 (e.g., a configuration adjustment instruction) directly to the first hop router 306a of source host 302. In turn, router 306a may send an ICMP fragmentation request message on to source host 302, thereby notifying source host 302 that it should either begin fragmenting its packets for delivery to destination host 304 or begin allowing fragmentation by unsetting the DF bits of its packets.

Also similar to the prior case of router 306c fragmenting packets, the corrective measure shown in FIG. 4C may be made automatically or based on input from a network administrator via a user interface. For example, if MTU mismatch assessment service 308 is part of a network assurance service, the administrator may be presented with information indicating that incoming ICMP packets are being blocked for source host 302 and that delivery of message 416 to router 306a would alleviate the MTU mismatch condition causing packets of source host 302 to be dropped.

In some embodiments, MTU mismatch assessment service 308 may also continue to monitor the operations of the path between source host 302 and destination host 304, to ensure that the problem condition has been alleviated. For example, if service 308 obtains an indication that the sent configuration adjustment instruction in message 416 did not alleviate the persistent MTU mismatch condition at router 306c, it may initiate other measures, such as retraining its machine learning model.

Figure 5:
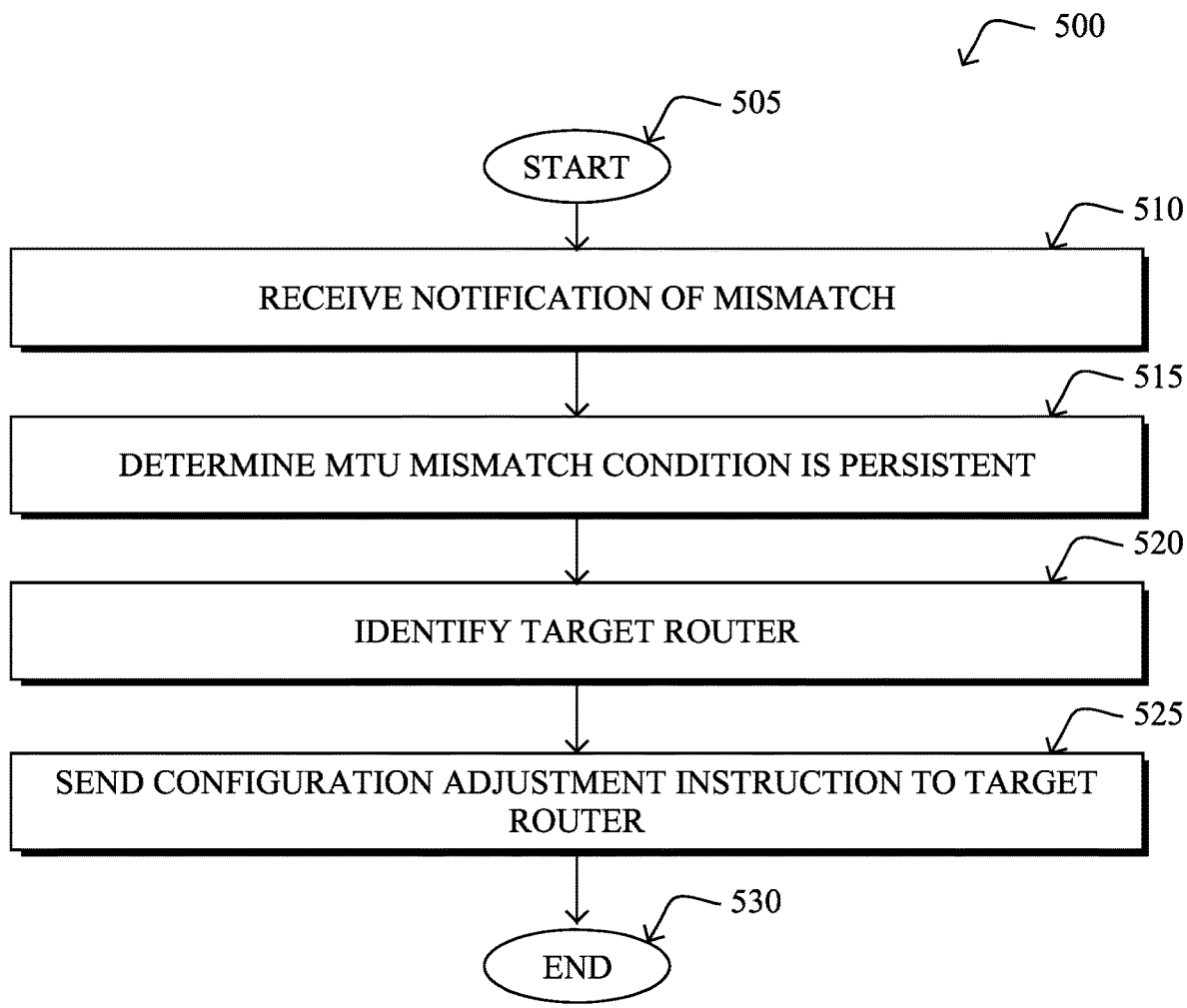
FIG. 5 illustrates an example simplified procedure for alleviating an MTU mismatch condition in a network.

FIG. 5 illustrates an example simplified procedure for alleviating an MTU mismatch condition in a network in a network, in accordance with one or more embodiments described herein. For example, a non-generic, specifically configured device (e.g., device 200) may perform procedure 500 by executing stored instructions (e.g., process 248), to provide an MTU mismatch assessment service to any number of networking devices along a network path. The procedure 500 may start at step 505, and continues to step 510, where, as described in greater detail above, the service may receive a notification of a mismatch between a packet size of a packet sent by a source to a destination in a network and an MTU of an intermediate router between the source and destination in the network. For example, the packet may be larger in size than the MTU of an egress interface of the intermediate router, thereby causing the mismatch. In such a case, the router may either drop the packet or fragment the packet (e.g., based on the DF bit of the packet).

At step 515, as detailed above, the service may determine, using a machine learning-based model, that the mismatch represents a persistent MTU mismatch condition at the intermediate router. For example, in the case of the intermediate router fragmenting packets sent from the source to the destination, the model may determine whether this condition is likely to occur again in the future and/or at a frequency or volume greater than a defined threshold. If so, the service may determine that corrective measures should be take.

At step 520, the service may identify a target router in the network to receive a configuration adjustment instruction, based on the persistent MTU mismatch condition, as described in greater detail above. In some embodiments, the target router may be the intermediate router that notified the service of the mismatch. For example, if the intermediate router continues to fragment packets between two of its interfaces, the service may determine that the MTU configuration of at least one of those interfaces should be changed. In further embodiments, if the intermediate router drops packets due to the MTU mismatch condition, such as when the DF bits are set in the dropped packets, the service may identify the first hop of the source as the target router.

At step 525, as detailed above, the service may send the configuration adjustment instruction to the target router, to alleviate the persistent MTU mismatch condition at the intermediate router. For example, if the target router is the intermediate router, the service may instruct the router to increase one of its MTU settings. Conversely, if the target router is the first hop of the source, the service may send an ICMP fragmentation request to the target router for forwarding to the source. In turn, the source may either stop setting the DF bits of its packets or fragment its packets into smaller packets, prior to sending. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the identification and alleviation of MTU mismatch conditions in a network. In some aspects, the techniques herein allow for the following:

1. Monitoring and learning continuously about MTU/fragmentation in the network without requiring user intervention.

2. Identifying and gathering all relevant information about the location and flow for which fragmentation is occurring or packets are getting dropped.

3. Optionally, a user interface that provides an administrator visibility into MTU mismatch conditions in the network.

4. Out-of-band messaging to update MTU on routers.

5. A validation mechanism to verify that the out-of-band 'MTU update' action was successful.

6. The ability to scale to large networks and many traffic flows.

While there have been shown and described illustrative embodiments that provide for discovering and alleviating MTU/fragmentation issues in a network, it is to be understood that various other adaptations and modifications may be made within the spirit and scope of the embodiments herein. For example, while certain embodiments are described herein with respect to using certain models for purposes of identifying ongoing MTU mismatch conditions, the models are not limited as such and may be used for other functions, in other embodiments. In addition, while certain protocols are shown, such as ICMP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a maximum transmission unit (MTU) mismatch assessment service, a notification of a mismatch between a packet size of a packet sent by a source to a destination in a network and an MTU of an intermediate router between the source and destination in the network;
   predicting, by the service and using a machine learning-based model, whether the mismatch is likely to reoccur in the future at a frequency or a volume greater than a predefined threshold;
   determining, by the service, that the mismatch represents a persistent MTU mismatch condition at the intermediate router when it is predicted that the mismatch is likely to reoccur in the future at a frequency or a volume greater than the predefined threshold;
   identifying, by the service, a target router in the network to receive a configuration adjustment instruction, based on the persistent MTU mismatch condition; and
   sending, by the service, the configuration adjustment instruction to the target router, to alleviate the persistent MTU mismatch condition at the intermediate router.

2. The method as in claim 1, wherein identifying the target router in the network to receive the configuration adjustment instruction comprises:
   determining that the intermediate router will fragment the packet and transmit fragmented packets towards the destination, based on the received notification indicating that a do not fragment (DF) bit is not set in the packet; and
   identifying the intermediate router as the target router, after determining that the intermediate router will fragment the packet.

3. The method as in claim 2, wherein the instruction is configured to increase an MTU configuration of the target router to at least the size of the packet.

4. The method as in claim 1, wherein identifying the target router in the network to receive the configuration adjustment instruction comprises:
   determining that the intermediate router will drop the packet, based on the received notification indicating that a do not fragment (DF) bit is set in the packet; and
   identifying a first hop router of the source as the target router, after determining that the intermediate router will fragment the packet.

5. The method as in claim 4, wherein sending the configuration adjustment instruction to the target router comprises:
   sending an Internet Control Message Protocol (ICMP) message to the target router that requests packet fragmentation by the source, wherein the target router sends the ICMP message to the source.

6. The method as in claim 1, wherein the notification indicates the source of the packet, the destination of the packet, whether a do not fragment (DF) bit is set in the packet, and an MTU configuration of the intermediate router.

7. The method as in claim 1, further comprising:
   obtaining, by the MTU mismatch assessment service, an indication as to whether the sent configuration adjustment instruction alleviated the persistent MTU mismatch condition; and
   initiating, by the MTU mismatch assessment service, retraining of the model when the obtained indication indicates that the sent configuration adjustment instruction did not alleviate the persistent MTU mismatch condition.

8. The method as in claim 1, further comprising:
   providing data regarding the persistent MTU mismatch condition to a user interface; and
   receiving an instruction via the user interface to send the configuration adjustment instruction.

9. An apparatus, comprising:
   one or more network interfaces;
   a processor coupled to the network interfaces and configured to execute one or more processes; and
   a memory configured to store a process executable by the processor, the process when executed configured to:
      receive a notification of a mismatch between a packet size of a packet sent by a source to a destination in a network and a maximum transmission unit (MTU) of an intermediate router between the source and destination in the network;
      predict, using a machine learning-based model, whether the mismatch is likely to reoccur in the future at a frequency or a volume greater than a predefined threshold;
      determine that the mismatch represents a persistent MTU mismatch condition at the intermediate router when it is predicted that the mismatch is likely to reoccur in the future at a frequency or a volume greater than the predefined threshold;
      identify a target router in the network to receive a configuration adjustment instruction, based on the persistent MTU mismatch condition; and
      send the configuration adjustment instruction to the target router, to alleviate the persistent MTU mismatch condition at the intermediate router.

10. The apparatus as in claim 9, wherein the apparatus identifies the target router in the network to receive the configuration adjustment instruction by:
    determining that the intermediate router will fragment the packet and transmit fragmented packets towards the destination, based on the received notification indicating that a do not fragment (DF) bit is not set in the packet; and
    identifying the intermediate router as the target router, after determining that the intermediate router will fragment the packet.

11. The apparatus as in claim 10, wherein the instruction is configured to increase an MTU configuration of the target router to at least the size of the packet.

12. The apparatus as in claim 9, wherein the apparatus identifies the target router in the network to receive the configuration adjustment instruction by:
    determining that the intermediate router will drop the packet, based on the received notification indicating that a do not fragment (DF) bit is set in the packet; and
    identifying a first hop router of the source as the target router, after determining that the intermediate router will fragment the packet.

13. The apparatus as in claim 12, wherein the apparatus sends the configuration adjustment instruction to the target router by:
sending an Internet Control Message Protocol (ICMP) message to the target router that requests packet fragmentation by the source, wherein the target router sends the ICMP message to the source.

14. The apparatus as in claim 9, wherein the notification indicates the source of the packet, the destination of the packet, whether a do not fragment (DF) bit is set in the packet, and an MTU configuration of the intermediate router.

15. The apparatus as in claim 9, wherein the process when executed is further configured to:
obtain an indication as to whether the sent configuration adjustment instruction alleviated the persistent MTU mismatch condition; and
initiate retraining of the model when the obtained indication indicates that the sent configuration adjustment instruction did not alleviate the persistent MTU mismatch condition.

16. The apparatus as in claim 9, wherein the process when executed is further configured to:
provide data regarding the persistent MTU mismatch condition to a user interface; and
receive an instruction via the user interface to send the configuration adjustment instruction.

17. A tangible, non-transitory, computer-readable medium storing program instructions that cause a maximum transmission unit (MTU) mismatch assessment service to execute a process comprising:
receiving, at the MTU mismatch assessment service, a notification of a mismatch between a packet size of a packet sent by a source to a destination in a network and an MTU of an intermediate router between the source and destination in the network;
predicting, by the service and using a machine learning-based model, whether the mismatch is likely to reoccur in the future at a frequency or a volume greater than a predefined threshold;
determining, by the service, that the mismatch represents a persistent MTU mismatch condition at the intermediate router when it is predicted that the mismatch is likely to reoccur in the future at a frequency or a volume greater than the predefined threshold;
identifying, by the service, a target router in the network to receive a configuration adjustment instruction, based on the persistent MTU mismatch condition; and
sending, by the service, the configuration adjustment instruction to the target router, to alleviate the persistent MTU mismatch condition at the intermediate router.

18. The computer-readable medium as in claim 17, further comprising:
providing data regarding the persistent MTU mismatch condition to a user interface; and
receiving an instruction via the user interface to send the configuration adjustment instruction.

* * * * *